Jan. 27, 1948.                A. MASON                 2,435,011
                          BAIT CASTING DEVICE
                          Filed Jan. 31, 1946
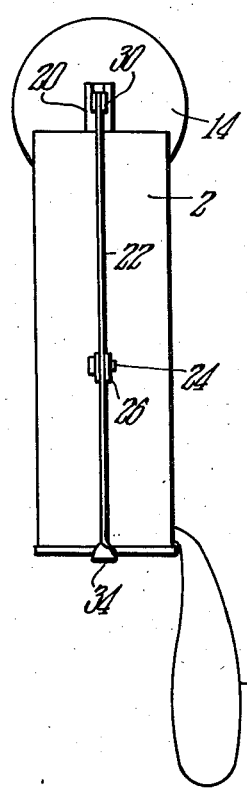
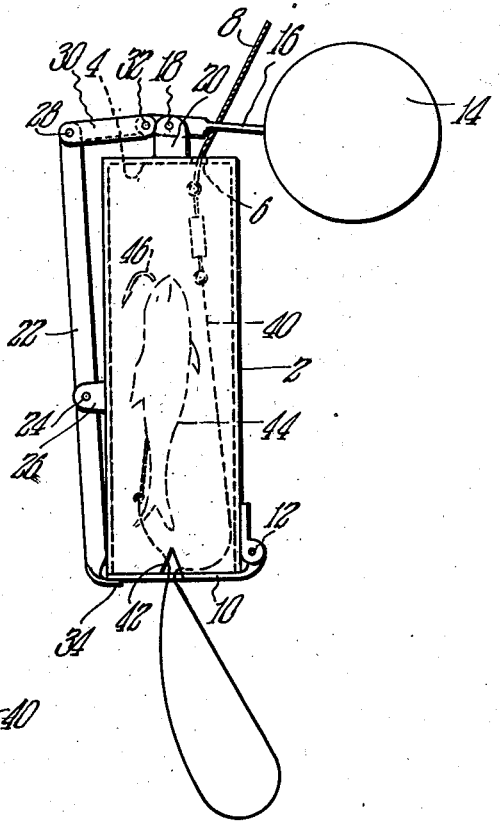
INVENTOR.
Anders Mason.
BY
Walter C. Ross
Attorney.

Patented Jan. 27, 1948

2,435,011

UNITED STATES PATENT OFFICE 2,435,011

BAIT CASTING DEVICE

Anders Mason, Springfield, Mass.

Application January 31, 1946, Serial No. 644,464

4 Claims. (Cl. 43—41)

This invention relates to fishing apparatus and is directed more particularly to a bait casting device.

The principal object of the invention is the provision of a bait casting device which is characterized by a receptacle for holding the bait which has a swingable closure operated by a float, the same being adapted and arranged whereby the bait such as a minnow or the like on the end of the line may be cast and when the same strikes the water the closure is opened to release the bait.

Thus the bait is protected as it is cast through the air and strikes the water which usually causes the bait to be mutilated or torn or thrown from the hook.

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawings wherein:

Fig. 1 is a side elevational view of a casting device embodying the novel features of the invention; and Fig. 2 is a front elevational view of the casting device shown in Fig. 1.

Referring now to the drawings more in detail, the invention will be fully described.

A receptacle 2 is provided which is preferably cylindrical and closed at one end by an end wall 4 which has an opening 6 therein through which the fish line 8 may pass.

A closure 10 at the other end of the receptacle is hinged to the receptacle at 12 for swinging movements between the closed position shown and an open position.

A float 14 has a rod 16 pivoted at 18 between ears 20 associated with the end wall 4. A link 22 is pivoted at 24 to a part 26 associated with the side wall of the receptacle and its upper end is connected at 28 to a connector 30 which has its other end connected at 32 to the rod 16, all as shown.

The lower end of the member 22 has a lip 34 which is adapted to overlie the closure 10 as shown to releasably hold the closure 10 in its closed position.

As the float moves upwardly from the position shown in Fig. 1 the lower end of the member 22 is swung outwardly away from the receptacle to release the closure 10 and as it is swung in an opposite direction, the member 22 moves so that the lip overlies the closure to hold it in its closed position.

A leader 40 may be secured to the end of the line and extend downwardly within the receptacle and out an opening 42 in a side thereof and back again through said opening so that a bait 44 associated with the hook 46 is connected by the leader to the line 8.

With the parts shown in the relationship of Fig. 1, the receptacle 2 with the bait therein is cast in the ordinary manner and as the receptacle strikes the water the buoyancy of the float is such that it moves upwardly relative to the receptacle, whereby through the link connections the closure 10 is released and the bait on the end of the leader leaves the receptacle.

The leader on the line may be weighted in any suitable manner but the bait being released from the receptacle and the receptacle being slidable relative to the line the buoyancy of the float causes the receptacle to rise to the surface of the water should it for any reason reach a point therebelow.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. Bait casting apparatus comprising in combination, a tubular receptacle for bait having an open lower end and a closed upper end provided with an opening for the passage of a line therethrough, a closure hinged to said receptacle and swingable between a closed position over the open end of the receptacle and an open position away therefrom, a float hinged to said receptacle for swinging movements, and a linkage operable by said float comprising a latch for releasably holding said closure in closed position.

2. Bait casting apparatus comprising in combination, a tubular receptacle for bait having an open lower end and a closed upper end provided with an opening for the passage of a line therethrough, a closure hinged to said receptacle and swingable between a closed position over the open end of the receptacle and an open position away therefrom, a float hinged to the receptacle for swinging movements, a member hinged to said receptacle for swinging movements and having a part for overlying said closure to hold it in closed position, and connections between said float and member whereby the latter is operated by the former.

3. Bait casting apparatus comprising in combination, a tubular receptacle for bait having an open lower end and a closed upper end provided with an opening for the passage of a line therethrough, a closure hinged to said receptacle and swingable between a closed position over the open end of the receptacle and an open position away therefrom, a float hinged to the receptacle for swinging movements, a member hinged to said receptacle for swinging movements and having a part for overlying said closure to hold it in closed position, and connections between said float and member whereby the latter is operated by the former, said receptacle being provided with an opening for a leader extending from a line in said receptacle outwardly and return to said bait within said receptacle.

4. Bait casting apparatus comprising in combination, a tubular receptacle for bait having an open lower end and an upper end wall provided with an opening for a line, a closure hinged to the receptacle and swingable between a closed position over the open end thereof and an open position away therefrom, a float hinged to the upper end wall, a latch member hinged to the receptacle and having a lip for overlying and holding the closure in closed position, and connections between said float and latch member whereby as the float swings in one direction the latch member is actuated for moving the lip away from said closure.

ANDERS MASON.

REFERENCES CITED

The following references are of record in the file of this patent:

UNITED STATES PATENTS

| Number | Name | Date |
|---|---|---|
| 1,764,738 | Marsters | Aug. 11, 1942 |
| 2,292,743 | Cordry | June 17, 1930 |